United States Patent [19]

Hines et al.

[11] 4,386,649
[45] Jun. 7, 1983

[54] PROGRAMMABLE THERMOSTATIC CONTROL DEVICE

[75] Inventors: Randal C. Hines, Morristown, Tenn.; Thomas J. Black, Dallas, Tex.

[73] Assignee: Nuclear Systems, Inc., Morristown, Tenn.

[21] Appl. No.: 169,175

[22] Filed: Jul. 15, 1980
(Under 37 CFR 1.47)

[51] Int. Cl.³ ............................................. F25B 29/00
[52] U.S. Cl. ....................................... 165/12; 165/25; 165/29; 236/46 R
[58] Field of Search ...................... 165/12, 29, 24, 25; 236/46 R, 91 D; 364/104, 557

[56] References Cited

U.S. PATENT DOCUMENTS

| | | | |
|---|---|---|---|
| 4,079,366 | 3/1978 | Wong | 340/309.4 |
| 4,162,036 | 7/1979 | Balduzzi et al. | 236/46 R |
| 4,191,328 | 3/1980 | Isaacs et al. | 236/46 R |
| 4,200,910 | 4/1980 | Hall | 364/104 |
| 4,206,872 | 6/1980 | Levine | 236/46 R |
| 4,215,408 | 7/1980 | Games et al. | 236/46 R |
| 4,264,034 | 4/1981 | Hyltin et al. | 236/46 R |
| 4,265,298 | 5/1981 | Sumner et al. | 165/12 |
| 4,266,599 | 5/1981 | Saunders et al. | 165/12 |
| 4,267,966 | 5/1981 | Neel et al. | 236/46 R |
| 4,274,145 | 6/1981 | Hendricks et al. | 236/46 R |
| 4,276,925 | 7/1981 | Palmieri | 165/12 |
| 4,298,946 | 11/1981 | Hartsell et al. | 236/91 D |

Primary Examiner—Albert W. Davis, Jr.
Assistant Examiner—Margaret A. Focarino
Attorney, Agent, or Firm—Pitts, Ruderman & Kesterson

[57] ABSTRACT

A programmable thermostatic control device for controlling the temperature within a preselected zone of an enclosed environment. The device can be readily installed and utilizes an interface unit through which the heating, ventilation and cooling system of a building and/or residence are connected to the device outputs. An operator is guided through the programming of the device by cueing or prompting lights which sequentially indicate the information to be entered on the keypad. The device is processor-based and controls the heating and cooling systems to maintain a preselected temperature range, and to establish a preselected temperature within the controlled zone at a predetermined time. The temperature within the control zone is established and/or maintained with maximum efficiency by controlling the stage and duration of energization of the heating and air conditioning units. To this end, means are provided for determining and continuously updating the recovery time necessary for establishing a preselected temperature, and utilizing this information to control the HVAC units.

8 Claims, 15 Drawing Figures

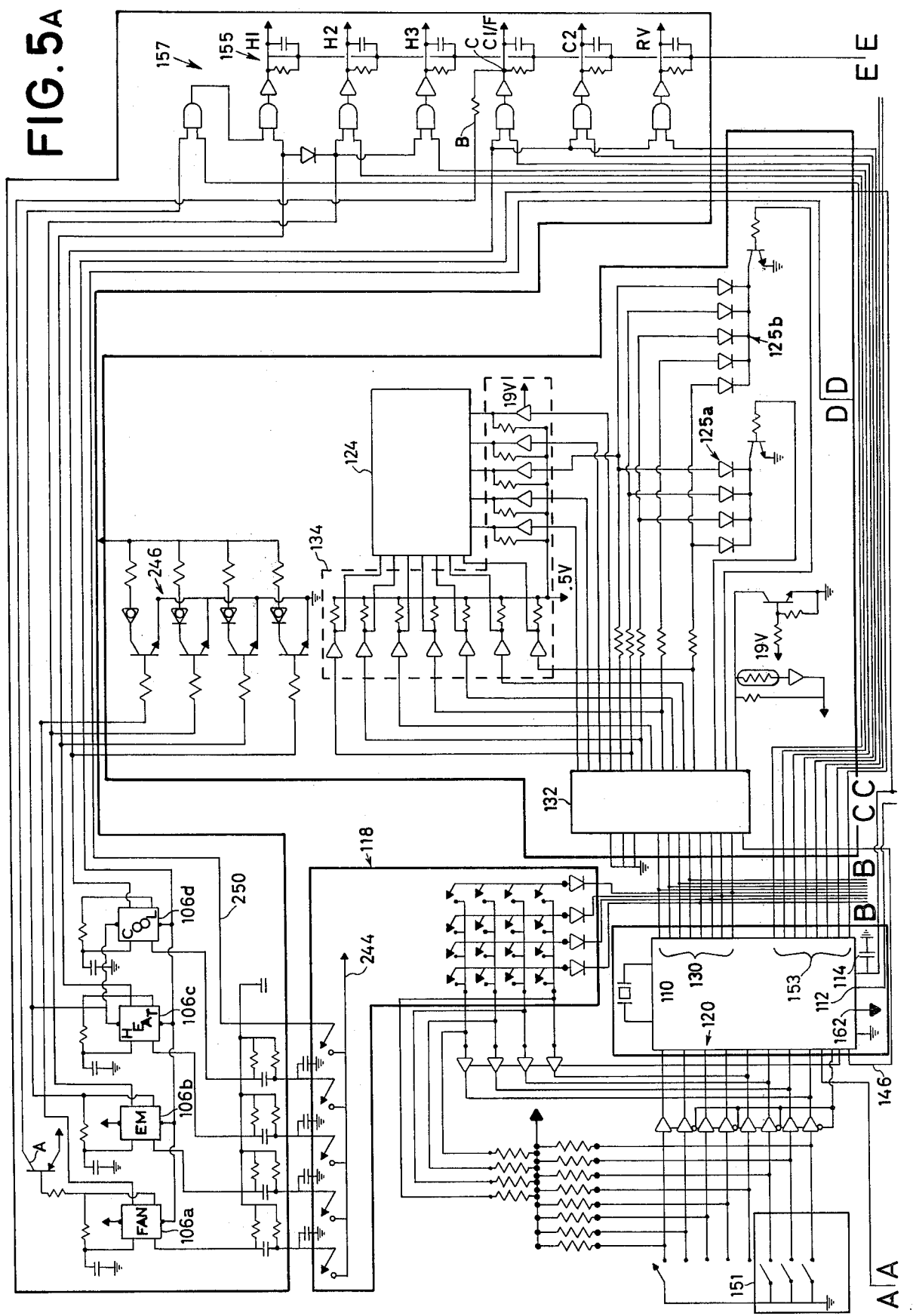

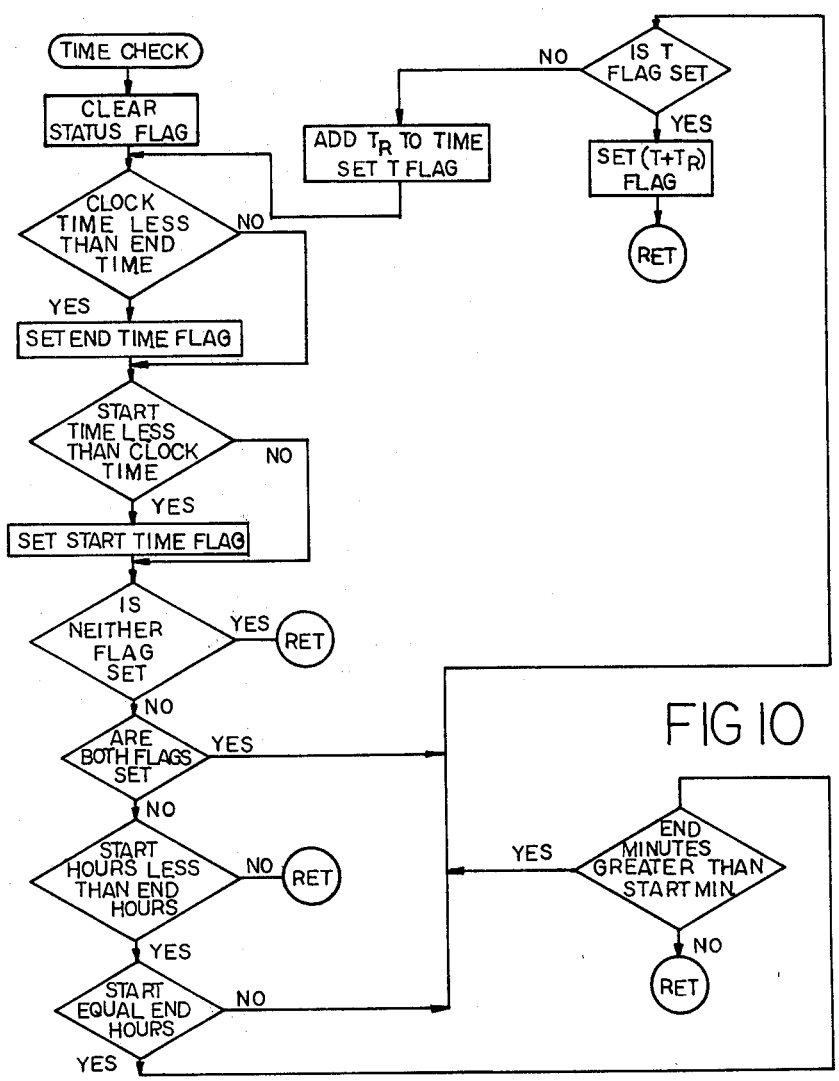
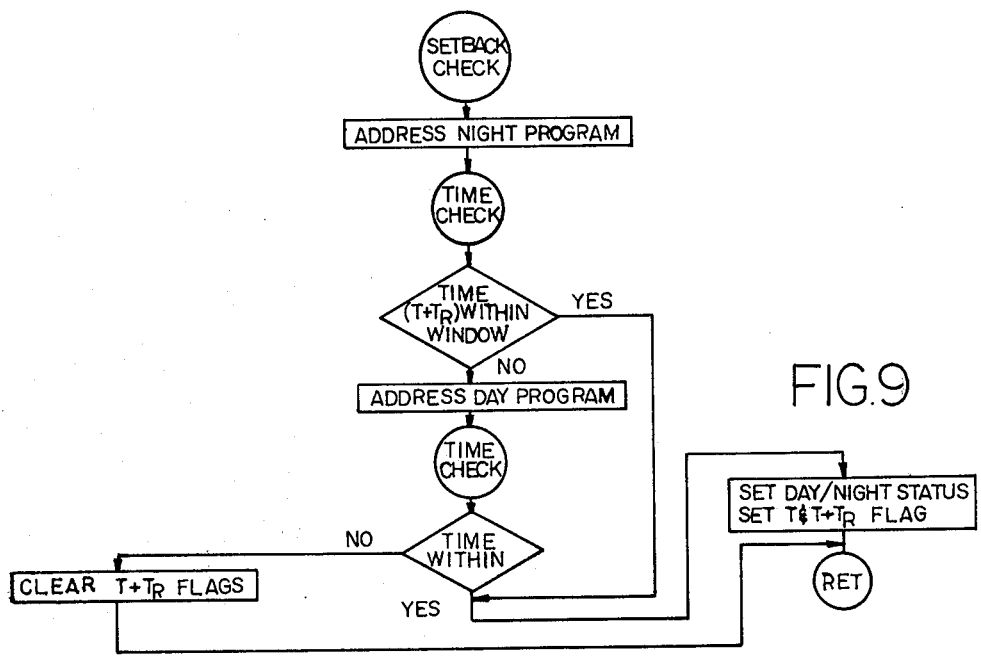
FIG 10
FIG. 9

PROGRAMMABLE THERMOSTATIC CONTROL DEVICE

DESCRIPTION

Technical Field

This invention relates to a thermostat and particularly to thermostats which employ electronic components for controlling the temperature in a preselected zone of an enclosed environment.

In residential and light commercial buildings the heating and air conditioning systems are a major source of energy consumption and expense. Often the heating, ventilation and air conditioning (HVAC) systems are operated inefficiently. For example, a control temperature may be maintained within a zone during times in which the zone is unoccupied such that the temperature will be set when the zone is again occupied. The maintenance of the control temperature during unoccupied times unnecessarily consumes expensive energy. Moreover, during the heating operation of a system employing heat pumps or multistage heaters, the heaters may automatically be energized with a resultant waste of energy, particularly where the weather conditions are not severe and the utilization of the multistage or auxiliary heaters is unnecessary.

In order to save energy and simultaneously maintain a control temperature or temperature range within a zone, it is important that the HVAC system be used intelligently and efficiently.

Background Art

Known prior art consists of thermostats which include bi-metal temperature responsive strips which control the temperature within a given zone or room. Moreover, it is known to use timing devices in combination with the thermostats to afford a setback mode which disables the HVAC system during preselected times in which the controlled zone is unoccupied. These systems often lack flexibility and cannot control certain operations of the HVAC system which cause substantial energy losses.

Accordingly, it is an object of the invention to provide a programmable thermostatic control device for automatically controlling the temperature in a preselected zone within a preselected range.

Another object of the invention is to provide a programmable thermostatic control device which incorporates setback programs such that the control temperature in the zone to be controlled can be setback during winter and setup during summer by a selected amount for selected periods each day and/or night in order to reduce the indoor-outdoor temperature differential.

A further object of the invention is to provide a programmable thermostatic control device which will predict the setback/setup recovery time to assure that normal temperature conditions are achieved at the termination of the setbacks/setup period.

A still further object of the invention is to provide a programmable thermostatic control device which selectively inhibits the auxiliary heating controls during recovery from setback periods.

Yet another object of the invention is to provide a programmable thermostatic control device which includes an alternating display of time and temperature except when the device is being programmed.

Another object of the invention is to provide a programmable thermostatic control device which incorporates a trip setback for continuous absence from the controlled zone for preselected periods up to 100 days.

It is also an object of the invention to provide a programmable thermostatic control device which can control nighttime and daytime setbacks/setup periods separately.

Other objects and advantages of the system will become apparent upon reading the following detailed description together with the drawings.

In accordance with the present invention, a programmable thermostatic control device is provided which automatically controls the temperature in an enclosed environment within a preselected range. The device includes a power supply and a programmable microprocessor which can be addressed by an operator through the operation of a keypad. A temperature monitor electronically determines the ambient temperature and supplies this information to one of the processor inputs. The processor in its normal mode of operation, continuously controls the HVAC system sections in accordance with a user program. The device is compatible with gas fire, electric heating and cooling systems and also heat pump systems. The system incorporates separate setback programs which allow adjustment of the comfort level of a home or building for various scheduled activity that do not require a constant temperature level. A setback recovery time feature continuously anticipates the time required to warm or cool the building to the normal temperature level when exiting a setback period. This feature enables the device to have a control zone at the normal temperature level at the end of the setback period which is unlike conventional setback thermostats which commences recovery only at the termination of the setback period. The system incorporates electronic keypad switches which provides fingertip control of the fan and the heating and cooling modes. A change between the heating and cooling modes can be provided automatically with conventional and heat pump systems. In the heat pump system a reversing valve control is provided to this end. Capricious cycling between heating and cooling states is eliminated inasmuch as a temperature band is established around the normal temperature and the temperature must change in excess of the temperature band in order to have a change in the heating or cooling state. Moreover, in one embodiment a heat or cool only mode can also be established through the control keypad.

BRIEF DESCRIPTION OF DRAWINGS

The details of the invention will be described in connection with the accompanying drawings, in which:

FIGS. 5 and 5A show a detailed electrical schematic of the programmable thermostatic control device;

FIGS. 8 through 12 are flow diagrams illustrating the flow of operation of the processing means of the present invention.

Referring now to the figures, various features of the invention will be described by describing the program flow and its interrelationship with the hardware.

Figure 3:
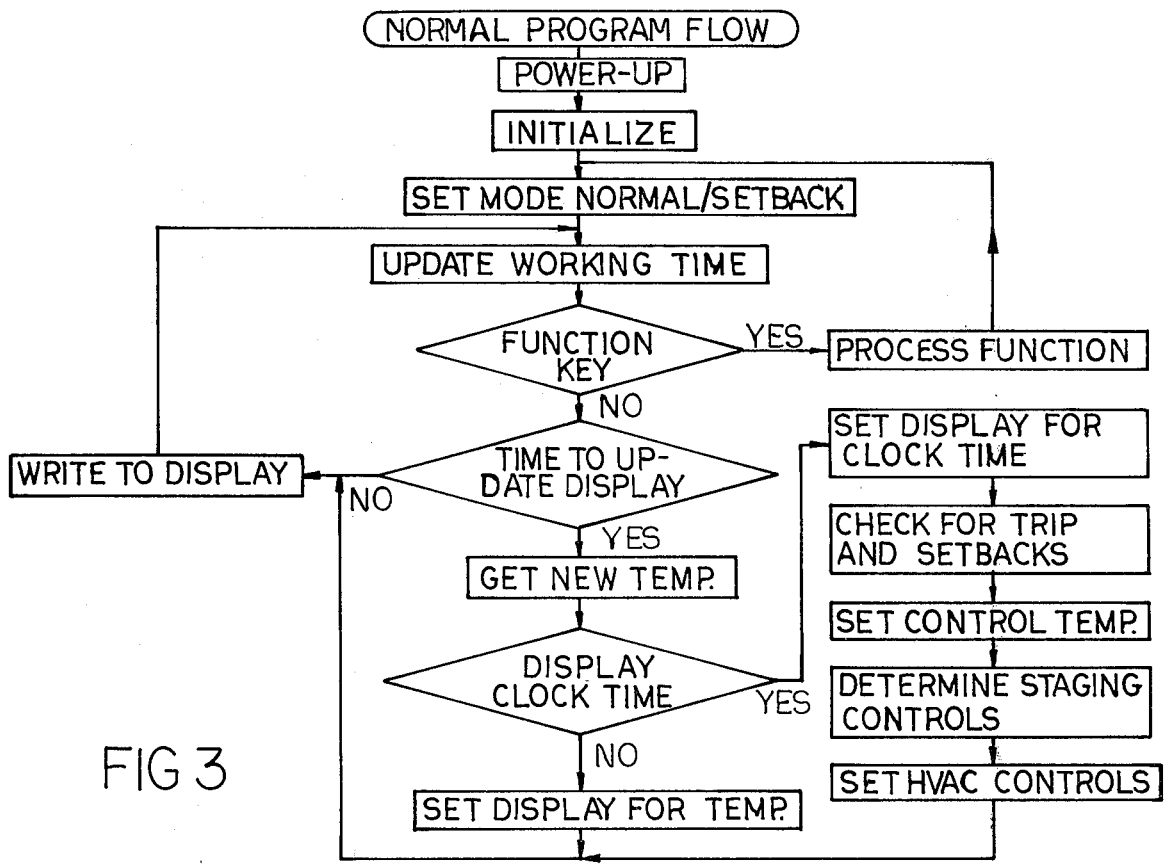
FIGS. 3 and 4 are flow diagrams illustrating the normal program flow and the interrupt program flow respectively.

The normal program flow is illustrated in FIG. 3. At the beginning of the operation of the system, leads 100 and 102 are connected with a power supply normally mounted in a relay box. This power supply in the preferred embodiment is a 24 volt DC supply with a 3 volt 60 Hz square wave superimposed thereon. Upon connecting leads 100 and 102 to the power supply, the system is placed in the POWER UP condition. During the POWER UP condition, the heating and air conditioning units are turned off and the flip-flops 106A-D which control the state of the fan, the emergency heat, the heating unit, and the cooling unit change states. The signal fed into terminal 112 of the microprocessor 110 maintains the microprocessor in an operative condition until the capacitor 114 charges and switches the voltage from a low to a high state at the terminal 112. Upon the voltage at the input terminal 112 changing to a high state, the heating and cooling units are enabled and the emergency heat and fan is disabled. In order to change the state of the HVAC flip-flops controlling the fan, emergency heat, heating and cooling units, the corresponding key on the key pad is depressed which will change the state (voltage) of the output of the flip-flops.

Subsequent to the enablement of the microprocessor, the system enters the INITIALIZE condition and certain information is automatically programmed into the programmable memory of the microprocessor. During the INITIALIZE condition, the normal temperature is set at 72° F., the system calibration is fixed at 0 and the clock is started at 12:00 midnight. Previously programmed memory is cleared together with information relating to the counters and flags. Also, during the INITIALIZE and POWER UP condition, the 60 Hz interrupt signal is blocked out from the processor.

As shown in the algorithm in FIG. 3, the microprocessor then makes a determination as to whether the system is in the NORMAL or SETBACK mode by reading the corresponding addresses in the programmable memory. This determination is made by the microprocessor upon determining the time of day, and reviewing this information in connection with the program entered by the operator. At any time after the INITIALIZE condition, the 60 Hz interrupt signal may take effect and move the system into the program or sequencing flow illustrated in FIG. 4 which will be described in greater detail hereinafter.

Figure 4:
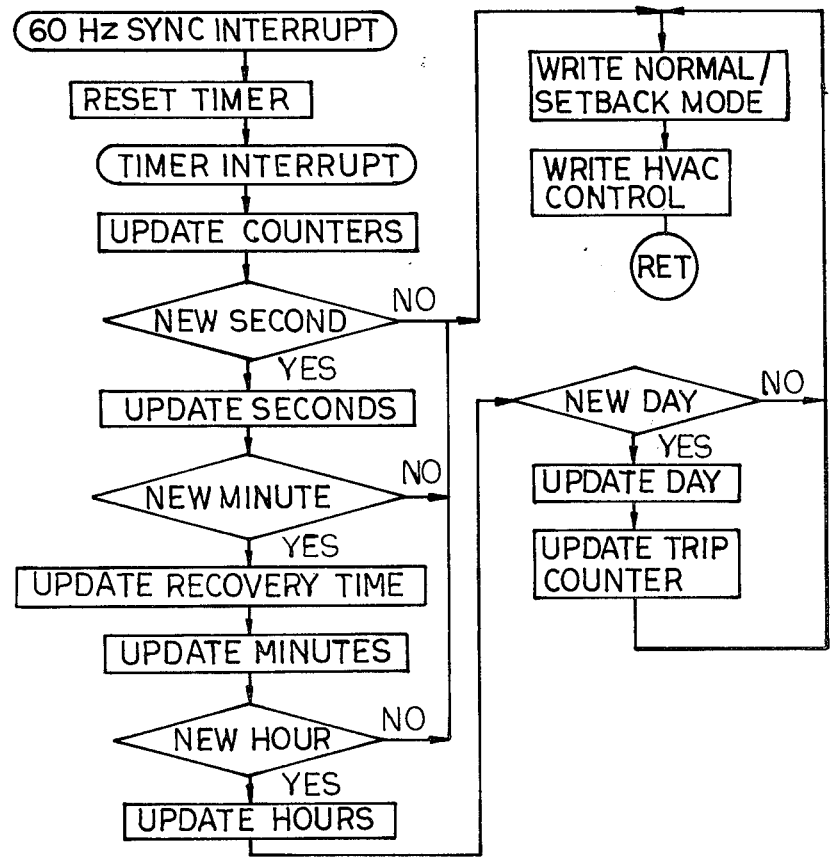

Subsequent to determining and setting the mode, that is, NORMAL or SETBACK, the microprocessor updates the working time by reviewing the time determined during the program flow illustrated in FIG. 4 and storing this updated time in the programmable memory. It will be noted that the working time of the system is determined internally and is not necessarily identical to the time displayed during the system operation.

Figure 5:
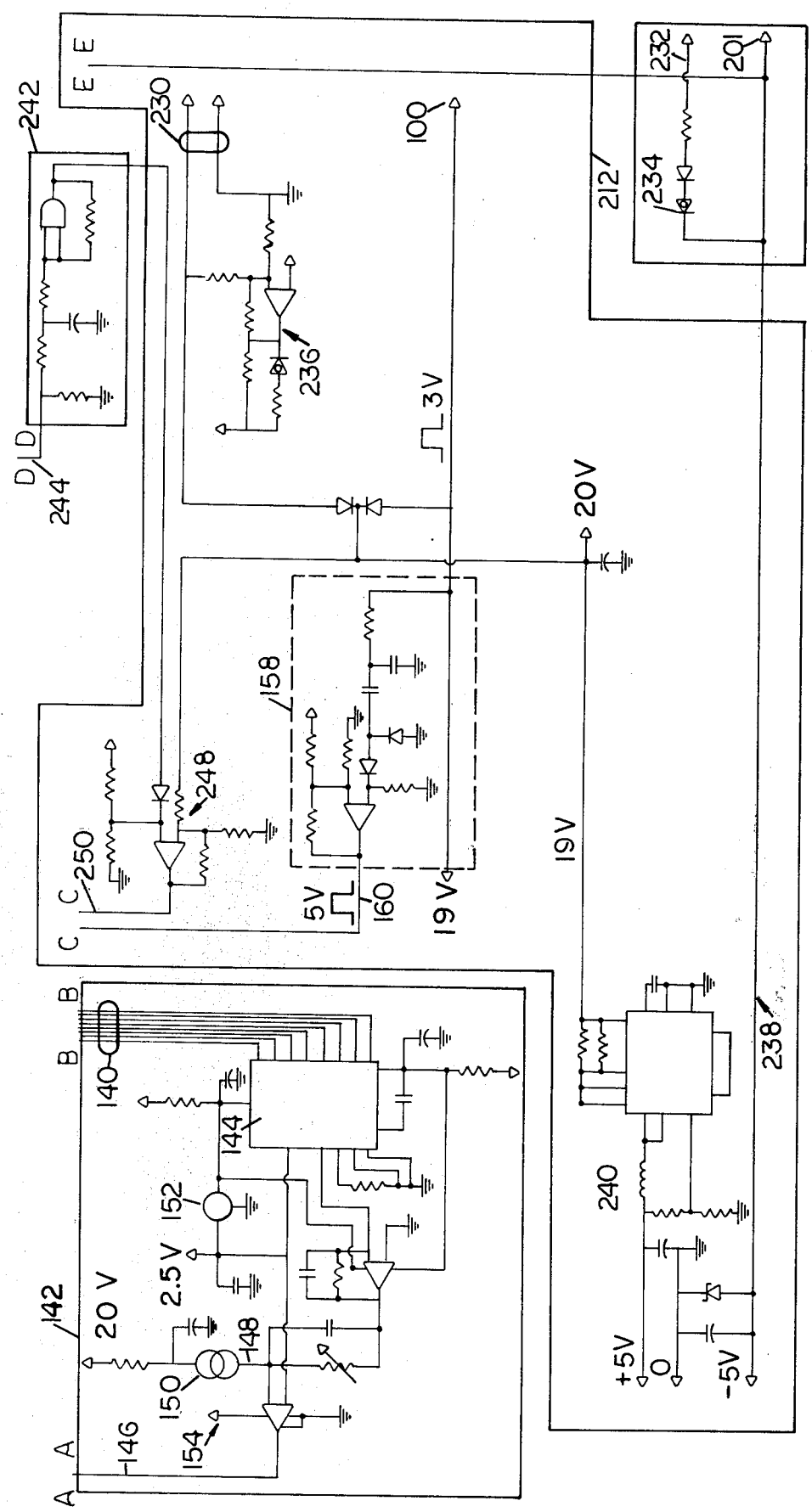

The microprocessor then reads the information programmed into the system through the key pad 118 to determine if any of the function keys, namely digits 1-9 excluding 5, have been depressed. If any of the function keys have been depressed this information is fed into the port 120 of the microprocessor. The microprocessor makes a determination as to which function key is depressed. Upon determining whether the function key has been depressed, the microprocessor enters the PROCESS FUNCTION condition. In this condition, the microprocessor addresses the appropriate memory locations in the permanent memory for the selected one of the function programs illustrated in FIG. 6. While in the PROCESS FUNCTION condition, the cueing or prompting lights, to be to be described in greater detail hereinafter, guide the operator during his programming of the microprocessor. More specifically, the cueing light will illuminate in one of the dial columns 121 or 123 adjacent the information which should be programmed into the unit by the operator to correspond with the permanent memory program of the function key depressed by the operator. The cueing lights illustrated at 125A-B, are controlled by the microprocessor as illustrated in FIG. 5, and a selected one of the cueing lights will illuminate during the programming operation adjacent the information which is to be fed into the device by the operation. For example, when the cueing light at 127 as illuminated, the operator will then program the maximum desired temperature into the system.

The microprocessor will then return to the SET MODE NORMAL/SETBACK condition and pass into the UPDATE WORKING TIME condition, make its FUNCTION KEY decision and upon determining that no FUNCTION KEY has been depressed subsequent to entering the PROCESS FUNCTION condition the microprocessor will then determine whether it is TIME TO UPDATE DISPLAY. In the preferred embodiment, the display 124 alternately and continuously displays the time and temperature at four second intervals. During the TIME TO UPDATE DISPLAY condition or mode the microprocessor determines by reading a corresponding counter whether it is time to update the display by determining if the counter is at the beginning of the four second intervals during which the time or temperature is written to the display. Obviously, it is not normally the precise beginning of one of the four second intervals at the time the microprocessor enters the TIME TO UPDATE DISPLAY condition. In the event it is not time to update display, the microprocessor follows the NO branch and writes to the display the updated working time. More specifically, the information to be written on the display is supplied through port 130 of the microprocessor to the display controller unit 132. This display controller converts the binary coded decimal digital information for the numerals to be displayed, to information which is supplied to the display determining which of the numerical segments of the display will be illuminated. This display controller controls six digits with each digit having seven segments which are selectively illuminated to characterize a preselected digit. Moreover, the display controller controls the decimal which is entered into certain of the display numerals. The numerals on the display 124 are entered sequentially and moved a space to the left as they are entered. The circuitry indicated at 134 in FIG. 5A, serves as a voltage shifter to shift the voltage from a positive 5 volts to 19 volts in the preferred embodiment for purposes of driving the numerical display which in the preferred embodiment requires the 19 volt supply.

The process will remain in the WRITE TO DISPLAY loop illustrated in FIG. 3 until it is time to update the display. Upon such a determination being made, the processor will enter the GET NEW TEMPERATURE condition. At this instance, the external display will be changing from a display of a temperature to a display of the time or vice versa. That is, the beginning of the four second display interval for the time or temperature will be reached. During the GET NEW TEMPERATURE condition, the microprocessor through a successive approximation process, will determine the external temperature. More specifically, a reference temperature will supply a first approximation or reference temperature at port 130. This information is fed along lines 140 into the temperature section 142. The temperature section 142 is a feedback system which converts the initial reference temperature supplied by the microprocessor along lines 140 from digital to analog information and the digital to analog converter 144. The output of the temperature section at 146 is normally low and switches to a high state upon the feedback system reaching the correct temperature. In this connection, the voltage at terminal 148 of the temperature sensor 150 is compared with the voltage supplied by the reference voltage source 152. When the voltage at the terminal 148 of the temperature sensor is greater than the reference voltage the comparator 154 will change states and supply this change state information to the microprocessor along the output line 146. As long as the comparator output is low, the microprocessor and the temperature section feedback loop will successively approximate the temperature until the correct temperature is reached. At this point, the output of the temperature section which goes high, and the microprocessor advances to a further step of its program.

In determining what the new temperature is, the microprocessor continuously watches the temperature calibration input for any adjustments which have been made by the operator, and also the microprocessor is programmed to include an exponential filter which prevents rapid changes in the temperature read by the microprocessor. This exponential filter eliminates sudden changes in the system state in response to an opening of a door or other change in the control zone which would normally result in turning the heating or cooling unit on unless such a delay in the temperature reading were occassioned.

Subsequent to the GET NEW TEMPERATURE mode the micrprocessor enters the DISPLAY CLOCK TIME mode. During this last mentioned mode, the microprocessor determines whether it is the beginning of the four second interval for displaying the clock time. If the beginning of the four second interval is not present as the microprocessor makes its decision in the DISPLAY CLOCK TIME mode, the microprocessor enters the SET DISPLAY FOR TEMPERATURE mode. During this mode the temperature as determined during the GET NEW TEMPERATURE mode is written into the programmable memory of a microprocessor. It is not, however, written on the display but made available for such writing. As indicated in the algorithm of FIG. 3, subsequent to the SET DISPLAY FOR TEMPERATURE mode, the microprocessor enters the write to display mode and the temperature is then written on the numerical display 124 in response to the operation of the display controller 132.

During the DISPLAY CLOCK TIME mode if the microprocessor determines that it is time to display the clock time, the microprocessor sequentially passes into the SET DISPLAY FOR CLOCK TIME mode illustrated by the YES branch leading from the DISPLAY CLOCK TIME mode. During the SET DISPLAY FOR CLOCK TIME mode the microprocessor reads the clock time from its internal clock and writes into its programmable memory this updated clock time. The hexidecimal temperature read internally by the microprocessor is converted to binary coded decimal numerals and is placed in the programmable memory of the microprocessor at the address from which the display information is read. As indicated on the algorithm of FIG. 3, the microprocessor next enters the CHECK FOR TRIP AND SETBACKS mode and compares any trip or setback information programmed into the programmable memory by the operator to determine if a trip or setback period is present.

The microprocessor then enters the SET CONTROL TEMPERATURE mode and the internal register or memory of the microprocessor is set with the control temperature. This control temperature which may be the maximum or minimum temperature in setback, or the normal or adjust temperature, subsequent to being set or entered into the programmable memory of the microprocessor is made available to the processor for making decisions.

The microprocessor then enters the DETERMINED STAGING CONTROLS mode. During this mode, the microprocessor reads the information at memory addresses preselected by operation of the switches 151. More specifically, the position of the switches 151 determined information programmed into preselected addresses read during the DETERMINED STAGING CONTROLS mode. This information specifies the comfort band around the control temperature which is normally set at 2° above and below the normal temperature. The zone temperature exceeds or falls below the control temperature by more than two degrees, for example, the microprocessor will make the appropriate adjustments in the heating or cooling system to maintain the zone temperature within the comfort band. Moreover, the switches 151 determine the temperature increment away from the control temperature at which the second state of heating or cooling is switched on. These switches also control the temperature increment from the control temperature at which the third stage of heating is actuated. Moreover, these switches control the temperature at which the automatic selection is made regarding a changing from the heating or cooling mode. In the illustrated embodiment when all of the switches are open; the comfort band is 1° F. the temperature increment second state is 2° F.; the temperature increment for the third stage heat is 3° F. and the automatic mode switching from heating to cooling occurs at 4° F. When the top switch is closed and the bottom two switches are open in the illustrated embodiment 1° is added to each above mentioned temperature bands. For example, the comfort band is in 2° and the temperature increment for the second stage is 3°. As mentioned hereinabove, switches 151 direct the microprocessor to specific memory locations at which the information stored in the memory is read during the DETERMINED STAGING CONTROLS mode. A determination is then made as to whether any of the heating or air conditioning units would be turned on and if so, which stage of such unit should be energized. This information is provided at the port 153 of the microprocessor and fed to the HVAC control 157 which are connected at their outputs to the various stage of the HVAC units. It will be noted that information applied to the HVAC controls or AND gates is compared with the staging information supplied at the output of the flip-flops 106. If and only if, the microprocessor directs the HVAC controls to energize a certain stage of the HVAC system and that stage of the system has been placed in the operational mode by the operator, that system or stage will be energized. For example, if the control temperature is 70° and the zone temperature has reached 67° with the temperature increment for the third stage heat being programmed by switches 151 to be 3°, the microprocessor will instruct the HVAC through its port 153 to actuate the third stage heat. If, however, the operator through the HEAT ON/OFF key has turned the heat off, no action will be taken external to the system.

The SET HVAC CONTROLS mode is the mode entered into subsequent to the microprocessor determining what the temperature within the zone is, what the control temperature is and upon writing this information at port 153.

The working time of the system is continuously updated during the 60 Hz SYNCHRONIZATION INTERRUPT operation as illustrated in FIG. 4. At any time after the microprocessor completes its INITIALIZE mode the normal program flow will be interrupted approximately sixty times per second in response to the presence of the 60 Hz squarewave superimposed on the 24 volt dc supply which is applied at terminal 100. More specifically, the 60 Hz interrupt comparator 158 (see FIG. 5) converts the 3 volt squarewave at its input into a 5 volt squarewave at its output 160. This 5 volt squarewave output is fed into terminal 162 of the microprocessor and interrupts the normal program flow for purposes of updating the system working time.

In response to the presence of the 60 Hz synchronization interrupt signal, the microprocessor resets its internal timer which is slightly slower than the 60 Hz interrupt timing. The internal timer then controls the balance of the 60 Hz SYNCHRONIZATION INTERRUPT flow.

Subsequent to the reset timer mode, each of the systems counters are updated and the microprocessor reads the second counter to determine if it has just completed its 60th count. If it has not just completed its 60th count the program flow follows the NO branch from the NEW SECOND mode and enters the WRITE NORMAL/SETBACK mode. During this operation, the microprocessor writes the information determined during the SET MODE NORMAL/SETBACK during the normal program flow. Next, the information set during the SET HVAC CONTROLS mode is written to the HVAC controls and the actual physical setting of the controls is undertaken. Subsequent to the setting of the HVAC controls the program returns to the location at which it was interrupted from the normal program flow of FIG. 3.

It will be recognized that normally the seconds counter will not have just completed its 60th count. However, if the seconds counter has just completed the 60th count the YES branch from the NEW SECOND mode of operation in FIG. 4 is followed and the microprocessor enters the UPDATE SECOND mode and one second is added to the seconds counter.

The microprocessor next enters the NEW MINUTE mode of operation and reads the minute counter to determine if it has just completed its 60th count. If the 60th count has not just been completed, the NO branch is followed and the processor enters the WRITE NORMAL/SETBACK mode, the WRITE HVAC mode and then returns to the point at which the normal program flow is interrupted as described hereinabove.

If the seconds counter has just completed its 60th count, then the microprocessor enters the UPDATE MINUTES mode of operation and one minute is added to the minutes counter.

The microprocessor next enters the UPDATE RECOVERY TIME mode of operation. During this operational mode, the microprocessor reviews information at preselected memory addresses concerning the operation of the heating and/or cooling elements prior to/during the setback period. Moreover, the microprocessor is programmed such that the most recent control operations on the heating and/or cooling units will be weighted the heaviest in making a determination of when the recovery time will begin. Further, the microprocessor will review the memory location at which the operator has programmed information concerning the insulation value of the house. With each of these data available the microprocessor will then determine at what time the recovery time should begin in order to establish the control temperature within the control zone at the termination of such period.

Subsequent to updating the recovery time, the microprocessor enters the NEW HOUR mode. It determines if the minute counter has just completed 60th count. If the 60th count has not just been completed the microprocessor follows the NO branch from the new hour mode turns on or off the normal/setback led, writes the HVAC control and returns to the point in the normal program flow at which the 60 Hz synchronization interrupt signal occured.

If the minutes counter has just completed its 60th count the microprocessor enters the UPDATE HOURS mode and one count is added to the HOURS counter.

The NEW DAY mode of operation is then entered and the microprocessor determines whether the hours counter has just completed its 24th count. If the hours counter has not completed its 24th count, the microprocessor follows the NO branch and energizes or de-energizes the normal/setback led, writes the HVAC control and returns to the normal program flow. If the hours counters has just completed its 24th count the microprocessor enters the UPDATE DAY mode of operation and one count is added to the day counter thus completing the process of updating the working time of the system. Upon updating the day counter, the microprocessor enters the UPDATE TRIP COUNTER mode of operation automatically, and one day is added to the trip counter. The microprocessor will then energize or de-energize the normal/setback led, write the HVAC controls and return to the normal program flow.

Figure 7:
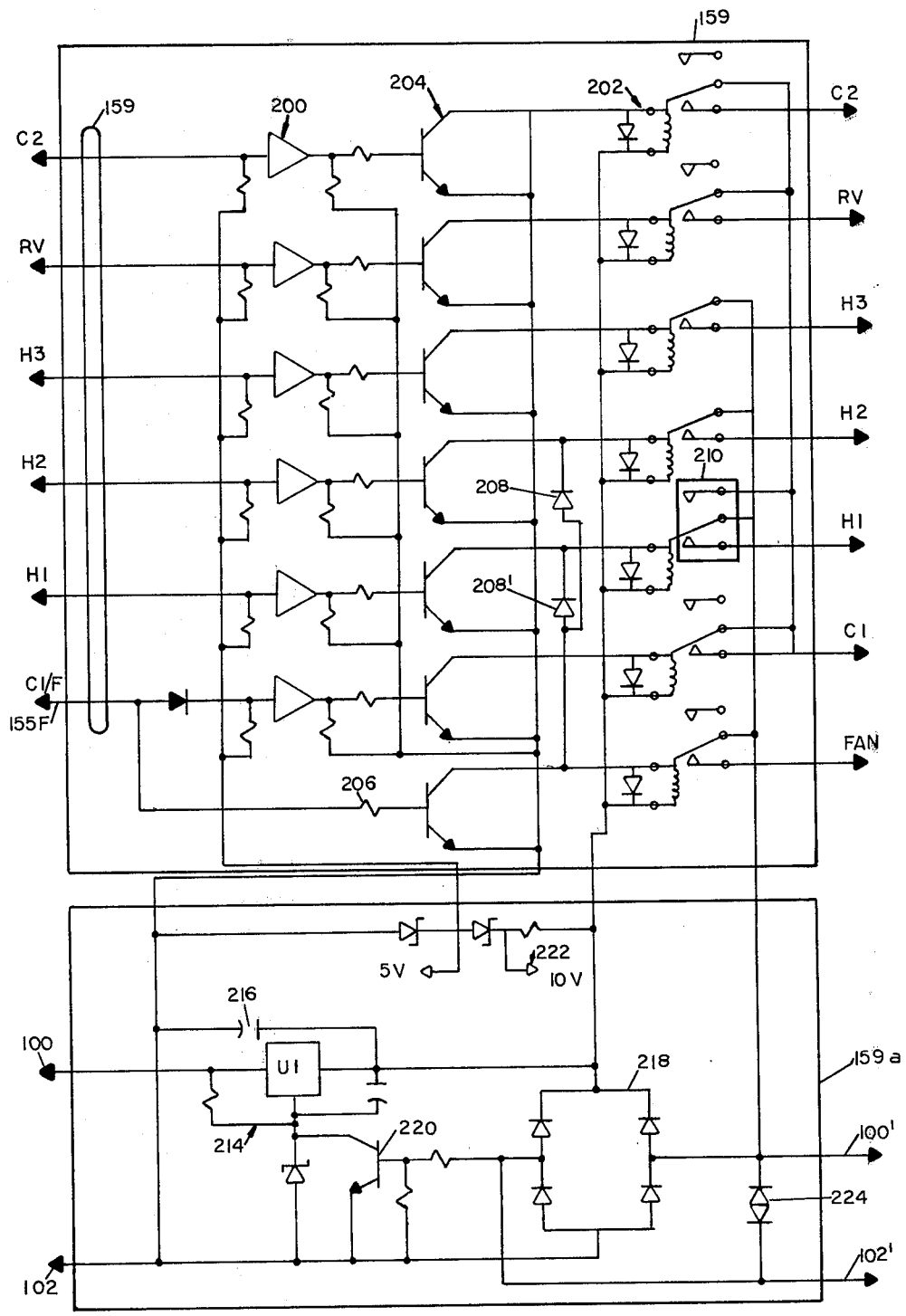
FIG. 7 illustrates the HVAC interface unit which facilitates retrofitting existing systems with the device of the present invention.
Figure 7A:
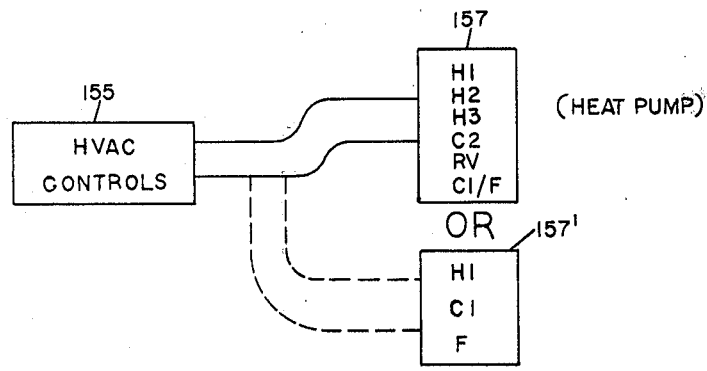
Figure 12:
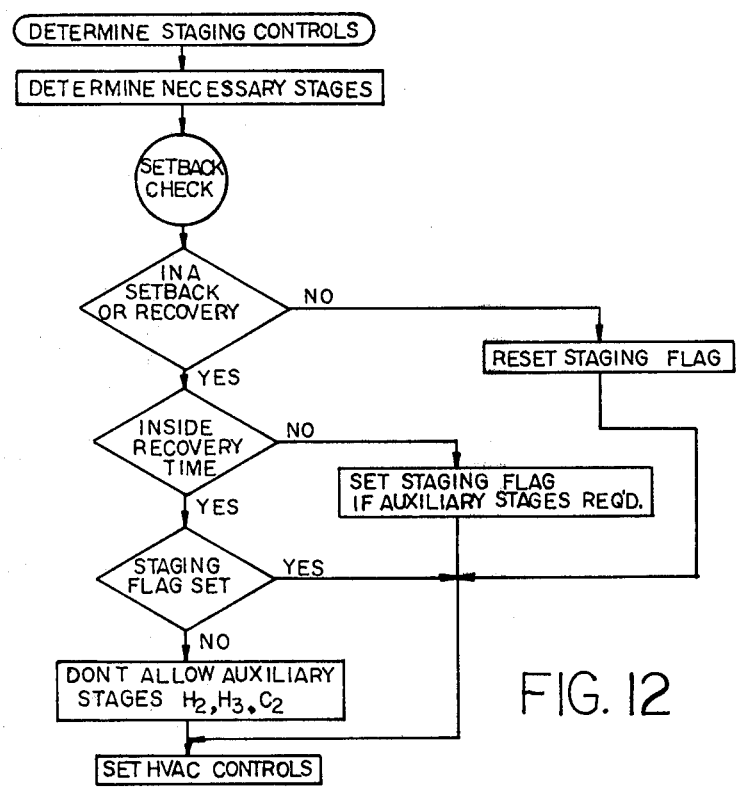

Referring now to FIG. 7, the writing diagram of the heating and air conditioning interface unit is illustrated. This interface unit is normally disposed at a remote location from the control device to provide a quite environment for the processor, and is connected to the HVAC controls 157 through the cable or wires 155 illustrated in FIGS. 7, 7A and 5A. The HVAC controls are wired to the interface unit 159 in accordance to FIG. 7A with the completed connections illustrated in the blocks. In FIGS. 5A, 7 and 7A, C1 represents the first stage cooling; C2 represents the second stage cooling; H1 represents the first stage heat; H2 represents the second stage heat; H3 represents the third stage heat; RV presents the reversing valve for a heat pump and F represents the fan. It will be recognized that all HVAC systems will not incorporate each of these sections, stages, etc. The present interface unit is designed to accommodate the various HVAC systems with minor wiring changes as illustrated in FIG. 7A by way of example.

Referring now to the schematic in FIG. 7 and its operation, the wires or cable 155 which are individually labeled, are attached to the corresponding wires at the output of the HVAC control 157 in FIG. 5A. As illustrated in FIG. 7 each of the inputs or wires 155 have associated with it a buffer generally indicated at 200. These buffers are designed for energizing their respective relay, serially connected with each buffer, for supplying power to the specified section of the HVAC system. In this connection, if the input of the buffer fed through the wires 155 exceeds a predetermined value (10 volts in the illustrated embodiment) the operatively associated transistor 204 through which the buffer is connected to its relay 202 is switched for supplying power and energizing the relay. Thus, if the microprocessor dictates that stage "1" of the heating unit should be turned on and the heating unit is enabled by the operator through operation of one of the flip-flops 106, the output at H1 of the HVAC control will be 8 volts or greater such that the respective H1 relay will be energized through the buffer and its serially connected transistor 204 as illustrated.

It will be recognized that the signal from the HVAC control fed along the C1/F line indicated at 155F controls both stage 1 of the cooling and also the operation of the fan. In this connection, the system installation and construction is simplified by eliminating wiring and the quantity of the input signals required to control the HVAC system. It will be noted by those skilled in the art that resistor 206 serves as a voltage divider such that when the voltage fed along the C1/F line exceeds a preselected value (5 volts in the preferred embodiment) the fan relay is energized and the fan is turned on through the interface unit. In order for the first stage cooling system to also be turned on the input voltage along the C1/F line must exceed a greater preselected value (10 volts in the preferred embodiment), and upon the occurrence of the greater voltage, both the fan and the first stage cooling unit will be energized.

More specifically, the interface unit includes decoding means for controlling a plurality of HVAC system sections from one or more input signals. In operation, there are four situations to consider. First, the fan in the automatic mode will be discussed. In this case, the HVAC fan is activated only when cooling has been enabled by the mode flip-flops 106 and C1 is called for by the processor with this situation then 10 volts at 155F is achieved which will saturate both the C1 and fan transistors 204 which in turn switch the C1 and fan relays. If cooling is not enabled on the flip-flops 106 or C1 is not called for by the processor, then 0 volts is achieved at 155F and neither C1 or the fan is activated.

In the case where the fan is in the continuous mode, the fan is activated regardless of whether C1 is called for. In the situation where fan only is desired, points A and B (FIG. 5A) will have 10 volts. The resistor between points B and C and resistor 206 (FIG. 7) acts as a voltage dividing network. Since the resistors are equal in ohmic value, point C has a magnitude of 5 volts. The 5 volts here is not enough (10 volts is required in the preferred embodiment) to switch buffer zoo between point C and the C1 relay. However, 5 volts is enough to saturate the fan transistor 204 which in turn switches the fan relay.

In the situation where C1 is desired and the fan is in a continuous mode, 10 volts is applied at point C (FIG. 5A) and the same condition is achieved as when both the C1 and fan relays are switched when the fan is in the automatic mode. In summary, the voltage divider network is used as a decoding means in the illustrated embodiment for controlling the fan alone or the fan and C1 together from a single input signal. More specifically, 0 volts at point C activates neither C1 or fan, 5 volts activates the fan alone, and 10 volts activates both C1 and fan. Of course, it will be recognized that voltages other that 0, 5, and 10 volts may be used to achieve the same results. It will be noted that point C in FIG. 5A is the same as point 155F in FIG. 7.

When the system is wired for controlling a heat pump, the diodes 208 and 208' serve to turn on the fan instantly by energizing the fan relay if the first and second heating stages have been energized. In systems not controlling a heat pump, these diodes may be eliminated or merely disconnected at the time of installing the interface unit.

A further feature of the invention is to provide an interface unit which prevents the possibility of energizing both the heating and cooling elements simultaneously. This is accomplished in the illustrated system by the switch 210 which is operated by the relay associated with the H1 line control. This switch serves to make power available to the cooling output line only if there is no power to the heating output line.

The circuits represents at 159A comprises a portion of the power supply circuitry illustrated at 212 in FIG. 5. More specifically, the series voltage regulator generally indicated at 214 serves to maintain a voltage of 24 volts DC on line 100. The filter capacitor 216 provides a rippled dc output approximating a dc signal. The full wave bridge rectifier 218 converts the ac signal into a rippled dc signal. Lines 100' and 102' are connected to the 24 volt ac and the common, respectively. The 60 Hz interrupt signal is generated by the operation or switching of the transistor 220 such that when the transistor is switched on, 24 volts are provided at the along line 100 and when the transistor is off, 27 volts are provided along line 100. Thus, a 3 volt 60 Hz squarewave is superimposed on the 24 volt dc approximating signal. The circuitry generally indicated at 222 serves as the supply voltage for the nodes indicated in the interface unit. The resistor 224 serves as a voltage transient suppressor.

Further details of the power supply will now be described in connection with power supply illustrated at 212 in FIG. 5. The leads generally indicated at 230 are connected or plugged in to a backup battery. A 24 volt dc signal with a 3 volt 60 Hz squarewave superimposed thereon is supplied at the inputs or lines 100 and 102 respectively. Line 232 is connected directly to the heat pump and the light emitting diode (led) 234 is illuminated when the heat pump is in the defrost mode. The circuitry generally indicated at 236 includes an illustrated led which is illuminated by the circuitry upon the circuit sensing a low battery condition. The voltage regulator 238 establishes the supply voltage for the logic and in the preferred embodiment the voltage is indicated at its output, namely 5 volts, 0 volts and −5 volts are supplied for the logic. The inductor 240 serves to supply power at the output to maintain a constant voltage supply in the event the voltage suddenly changes.

Referring to FIGS. 5 and 5A, the supply voltages for a preferred embodiment are illustrated. All of the supply voltages are 5 volts in the preferred embodiment unless otherwise indicated on the figures.

FIG. 5 also illustrates the reset key circuitry 242 which is connected to the keyboard or keypad 118 through line 244 of FIG. 5A. The reset comparator 248 which is connected along line 250 to the HVAC control shown in FIG. 5A serves to control the enablement information fed into the "AND" gates of the HVAC controls 157.

Referring now to the display in FIG. 5A, the state of each of the fan, emergency heat, cooling units and heating units is indicated by one of the LEDS 246. If one of the LEDS is illuminated, it indicates that that particular system element such as the emergency heat, is enabled. The LED is illuminated on the face of the system in one of the columns 123 and/or 127 adjacent the system element which is enabled. Similarly, the defrost led 234 illuminates in column 123 adjacent to word "DEFROST", if the heat pump is in the DEFROST mode. Similarly, the low battery indicator LED illuminates proximate the word "BATTERY" if the battery needs replacing.

Figure 1:
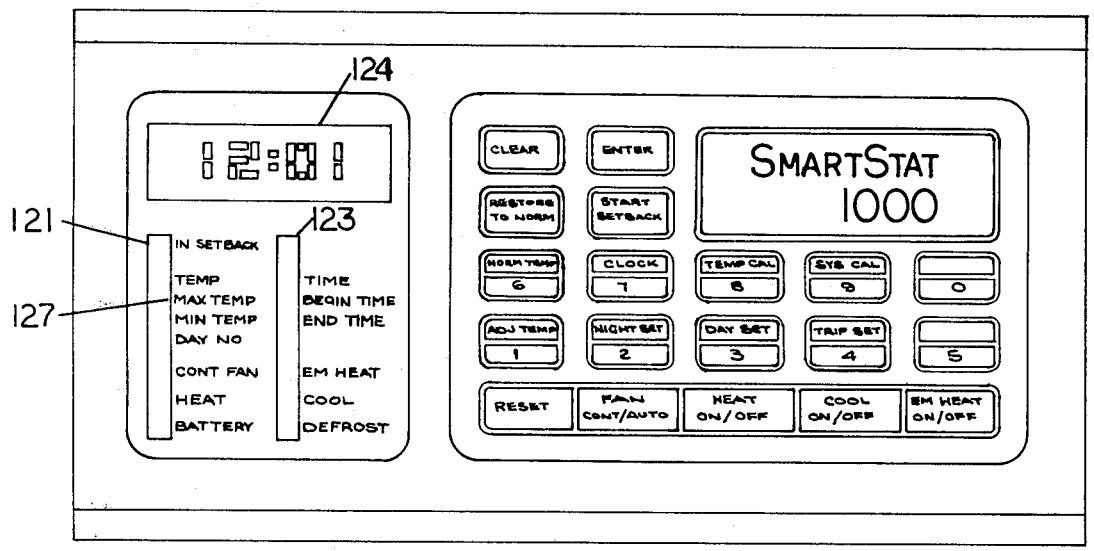
FIG. 1 is a front elevation view of the face of the device illustrating the keypad.
Figure 2:
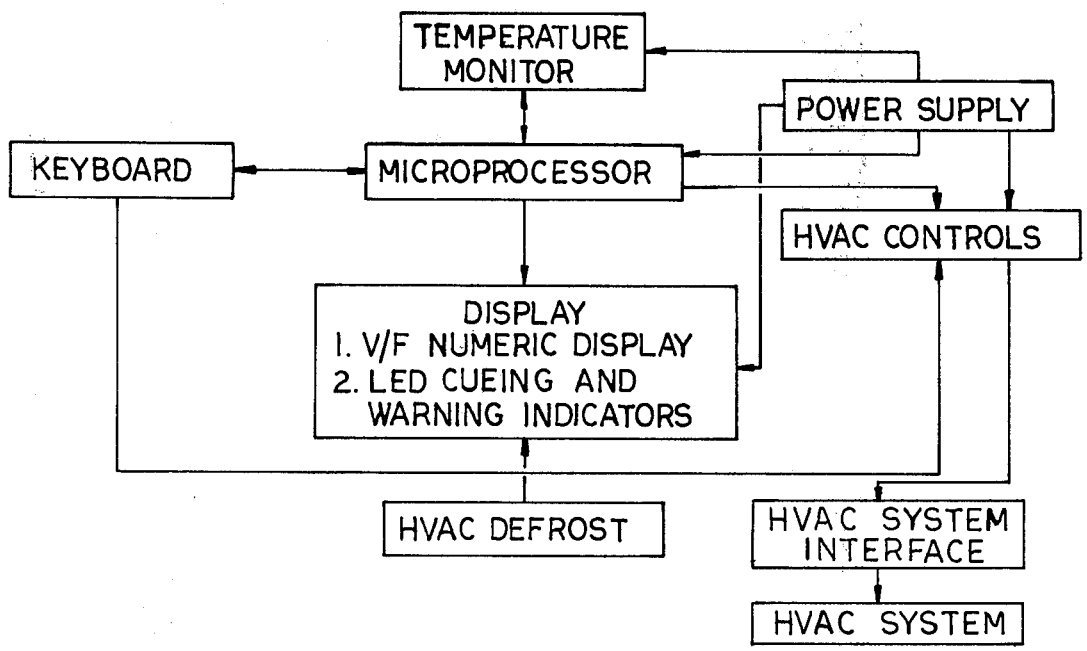
FIG. 2 is a block diagram of a programmable temperature control device embodying various features of the invention.
Figure 6:
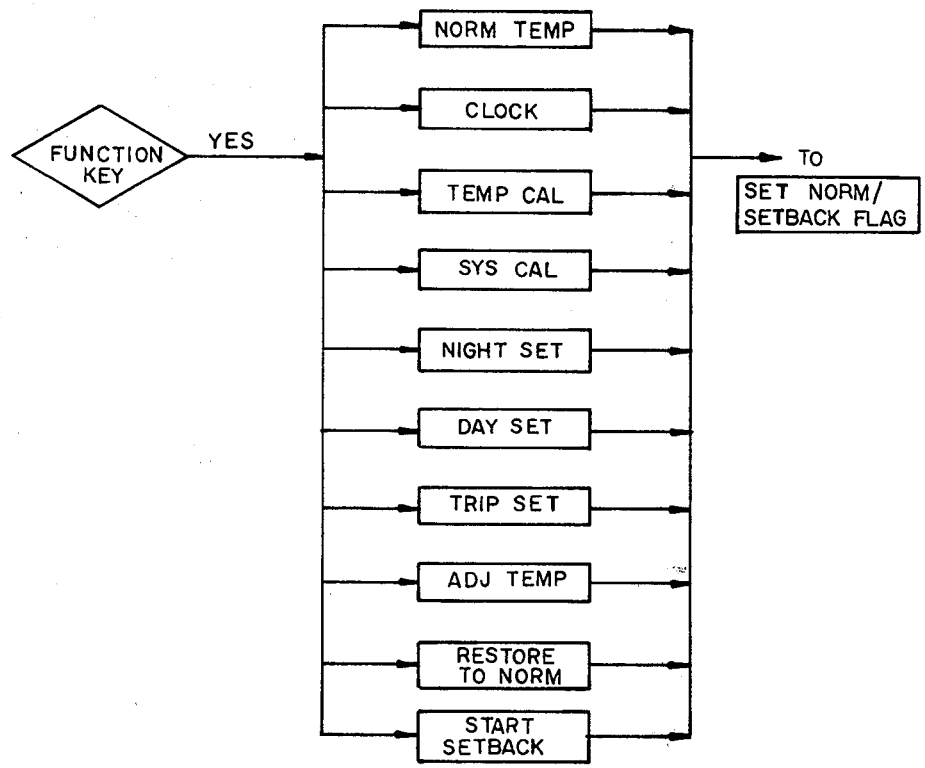
FIG. 6 is a flow diagram illustrating the PROCESS FUNCTION mode illustrated in FIG. 3.

Referring now in greater detail to certain operations of the processor means, the keypad is provided with a plurality of function keys which are selectively depressed by an operator for controlling the thermostatic device. More specifically, as illustrated in FIG. 1 there are 9 function keys which may be actuated by the operator namely: RESTORE TO NORM; START SETBACK; NORMAL TEMPERATURE; CLOCK; TEMPERATURE CALIBRATION; SYSTEM CALIBRATION; ADJUST TEMPERATURE; NIGHT SETBACK; DAY SETBACK; and TRIP SETBACK. The abbreviations for these function keys are illustrated on the keypad in FIG. 1. During the normal program flow as illustrated in FIG. 3, the processor enters the PROCESS FUNCTION MODE if any one of the mentioned function keys has been depressed. Information controlling the processor function is stored in the permanent memory such that the depression of a selected one of the process keys directs the processor logic flow to a preselected section of the permanent memory corresponding with the processor function key which has been actuated by the operator. As illustrated in FIG. 6, there are 10 permanent memory programs or subroutines addressable by the operator in response to the operation of a corresponding function key on the keypad. Subsequent to the processor determining which function key has been depressed and which subroutine is to control certain of the processor operations, a flag is set upon the processor exiting the PROCESS FUNCTION MODE. The flag is used internally by the processor in subsequent decisions and in determining program flow.

Figure 8:
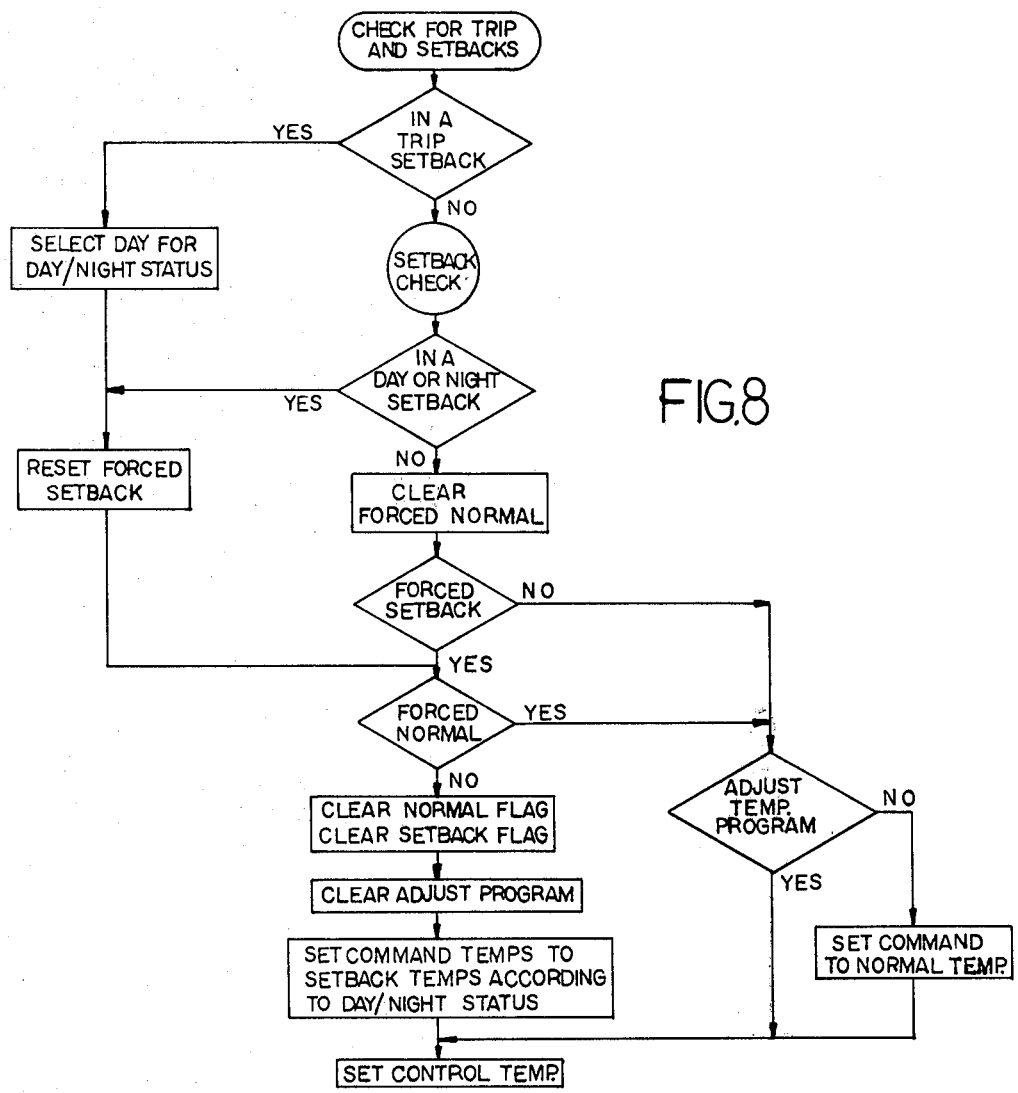

As illustrated in FIG. 8, under the subroutine of CHECK FOR TRIP AND SETBACKS, the processor determines if the internal clock is in a trip period. And if it is not the processor makes a SETBACK CHECK. This SETBACK CHECK subroutine will be described in greater detail hereinafter. Next, the processor determines if the clock is in a day or night setback period. In this connection the processor reviews the T+TR flag described in greater detail hereinafter. If the answer to this decision is no, then the processor is operating in a normal mode and the processor next clears the forced normal which is a process programed by the operator upon depression of the RESTORE TO NORMAL key which removes the processor from a setback mode temporarily. A determination is next made as to whether the user has programmed a forced setback, and if so whether a forced normal is programmed. If the answers are respectively yes and no, then the normal flag and setback flags are cleared together with the adjust program. The command temperatures or temperatures controlling the processor operation during a particular period, as programmed by the user, are then set internally to the setback temperature in accordance to the night/day status. The control temperature is then set. As shown in FIG. 8 if there is no forced setback or if there is a forced normal a determination is made as to whether an ADJUST TEMPERATURE PROGRAM has been entered. If the answer is no, then the command temperature is set to the normal temperature. If the answer is yes then the control temperature is set. As shown in the TRIP SETBACK section of the subroutine, if the processor is in a trip setback a day is selected for the day/night status, and the forced setback is reset as when the determination is made that the period is in a DAY OR NIGHT SETBACK.

Figure 6A:
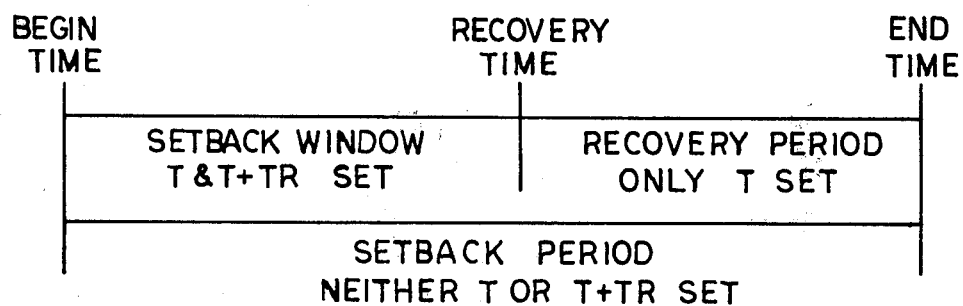
FIG. 6A illustrates the modes of the processor operation as controlled by the T and T+TR flags.

It will be recognized that there are three states of the processor operation, namely NORMAL, SETBACK, or RECOVERY. These three states are defined in the processor by two flags, the (Time Flag) and the T+TR Flag (The Recovery Time Flag). When neither the T nor the T+TR flag is set the processor is operating in the NORMAL mode. When both the T and the T+TR flags are set, then the processor is operating in the setback window illustrated graphically in FIG. 6A. During this mode of operation, the clock time is between the beginning of the setback period and the time to begin the recovery. (See FIG. 6A) When only the T flag is set, the processor is operating in the recovery period.

FIG. 9 illustrates more completely the processing operation during the SETBACK CHECK subroutine of FIG. 8. More specifically, in the SETBACK CHECK subroutine processor addresses the night program that is, the maximum and minimum temperatures are viewed together with the begin time and end time which are entered by user in the register. Subsequent to the ADDRESS NIGHT PROGRAM mode, a time check is made (as will be described in greater detail hereinafter) to determine if the internal clock time is within the setback period or within a setback window. If the clock time is not within the setback window, then the day program is addressed and a determination is made as to whether the time is within a day setback window. If the time is within a night or day setback window then the day and night status is determined and the time flag (T) and recovery time flag (T+TR) is set. If the time is not within a day or night setback window, then the recovery time flag is cleared. It will be recognized by those skilled in the art that upon setting the night/day status a communication is made as to whether night or day setback period has been found and this information is used in connection with determinating the logic flow.

FIG. 10 illustrates the TIME CHECK subroutine mentioned hereinabove. During the subroutine the processor determines if the internal clock time is within a setback window or more specifically, if the clock time (T) plus the recovery time (TR) is within the setback window. If the clock time plus the recovery time are within a setback window during the operational mode of the system is determined by the user introduced setback program. If the clock time plus the recovery time is not within a setback window, then the recovery or warm-up period has begun and information is supplied to the interface unit to activate selected sections of the HVAC system.

In the TIME CHECK subroutine the status flags are cleared including the end time, start time, clock time, and T+TR flag. A determination is made as to whether the clock time is less than the end time of the setback period. If the answer is yes, then the flag for the end time of the setback period is set. If a determination is made that the clock time is not less than the end time of the setback period or subsequent to setting the end time flag, a decision is made as to whether the start time for the setback period is less than the clock time. If this determination is made then the clock time is less than the end time and greater than the start time meaning that the clock time is withing the setback period or window. A decision is next made as to whether either the start or the end time flags were set. If neither flag is set then the TIME CHECK subroutine is exited. If one of the identified flags are set then a determination is made as to whether both flags are set. If both flags are set then the YES branch is followed and a determination is made as to whether the clock time (T) flag is set. If the T or clock time flag is set the T+TR flag is set and the subroutine exited. If the clock time flag is not set, then TR (recovery time) is added to the time and the T+TR flag is set.

If both the start time and end time flags are not set a determination is made as to whether the start hours time is less than the end hours time and if the answer to this determination is no, meaning that the setback period has lasped, the subroutine is exited. If the start hours is less than the end hours a determination is made as to whether the start time is equal to the end time and if the answer is no, the NO branch directs the logic flow into the subroutine described hereinabove upon a determination that both the start and the end flags are set. If the start time is equal to the end time or hours, a determination is made as to whether the end time minutes are greater than the start time minutes and if the answer is no the subroutine is exited. If the answer is yes then the logic flow is directed to a determination as to whether the clock time flag is set.

A significant feature of the invention is to provide a continued update of the recovery time in response to ambient conditions, such that a preselected temperature will be established within the control zone at the termination of the setback period. In order to predict a recovery or warmup time, the following equation is utilized:

$TR(N+1) = TR(N) - (1/B.TR(N)).OFF) + 4(t)/c$ $TR(N+1)$ = Recovery time at end of N+1 approximation i.e., the updated recovery time $TR(N)$ = Recovering time at end of Nth approximation cluding the volume of a house, size of the heating and air conditioning system, insulation of a house, outdoor temperature, etc. In the preferred embodiment the system calibration ranges from 0 to 9 with the lower number representing more desirable conditions for example, better insulation, an adequate heating and air conditioning unit, etc. Upon initialization of the system the system calibration counter is initialized to 0. It will be recognized that time is added less often to the recovery time when a lower system calibration number is entered by the user inasmuch as the conditions are less harsh and the systems more efficient.

Figure 11:
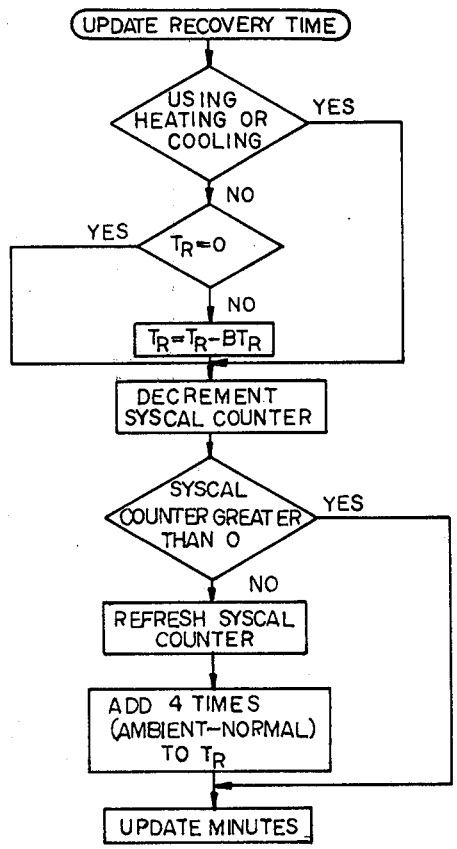

As illustrated in FIG. 11, in the UPDATE RECOVERY TIME subroutine, a determination is first made whether a heating or cooling unit is being used. If no heating or cooling unit is being used, then the recovery time (TR) is inspected to determine if the recovery time is 0. This condition would exist when the control zone temperature is 72°, and the control temperature programmed into the device by the user is also 72°. If the desired temperature is not presently maintained within the control zone, the recovery time is modified. It will be noted that if both the heating and cooling units are off, then a deduction is made from the recovery time inasmuch as no energy or HVAC operation will be required to establish the preselected temperature during the recovery period. If the heating or cooling units are on, adjustments will be made in the recovery time 1 time per minute. In the preferred embodiment the recovery time is kept in 1/10 of a minute and can be up to 800 minutes in length. The amount of the recovery time deducted upon the condition of the heating and cooling units being off is 0.015 times the most previous recovery time. This amount is deducted 255 times out of 256 inspections and on the 256 inspection 1/10 of a minute is deducted. It has been found that this deduction scheme has proven to be satisfactorily in predicting an accurate recovery time. Moreover, it will be noted that the updated recovery time includes variables utilizing the duty cycle periods of the HVAC units. The duty cycle is defined as being 1 minus the fraction comprising the off time divided by the off time plus the on time of the HVAC system.

Subsequent to adjusting the recovery time, the system calibration counter is decremented and next a decision is made as to whether the system calibration counter is greater than 0. If the system calibration counter is not greater than 0, this counter being a microprocessor register, the system calibration counter is refreshed and then another constant is added to the recovery time, this constant being four times the ambient temperature less the normal or desired temperature. The minutes are then updated as when the system calibration counter is greater than 0.

A further feature of the invention is to control the energization of the various HVAC stages such that in a recovery time. If the time is within a recovery time, the staging flag is inspected to determine if it is set. If the staging flag is not set, then the processor will not allow the auxiliary stages to be enabled and the HVAC controls are set. If the system is not within a recovery time, then the staging flags are set if auxiliary stages are required. If the system is not in a setback or recovery time, the staging flags are reset and subsequently the HVAC controls are set.

It will be recognized by those skilled in the art that the thermostatic control device described herein is expecially useful for controlling heat pump and other multi-stage systems. In this connection, the auxiliary heat is inhibited by the processor and the associated hardware during the recovery period unless it is used in setback. Moreover, the processor and the associated hardward prevents the device from entering a setback period if the recovery time is greater than or equal to the setback period. If this last mentioned condition occurred, the device could not bring the temperature up to a preselected temperature without the use of the auxiliary heat, which would, of course, result in an inefficient operation of the system.

In heat pump controlled operations, the recovery time is a function of the length of time the heat pump is operating. For example, as the temperature outside the controlled zone gets colder, the heat pump gets less efficient and therefore runs more. Accordingly, the recovery time will be increased.

From the foregoing detailed description, it will be recognized that the illustrated programmable thermostatic control device is suitable for replacing the conventional thermostat that controls HVAC systems in residential, light commercial in the institutional buildings. The device or system is compatible with gas fired, electric heating and cooling systems and also heat pump systems. The system incorporates three separate setback programs which allow adjustment of the comfort level of a home or building for various scheduled activities that do not require a constant temperature level. A setback recovery time condition continuously anticipates the time required to warm or cool the building to the normal temperature level when exiting a setback period. This features enables the device to establish within a controlled zone, the normal temperature level at the end of the setback period, which is unlike conventional setback thermostats which commence recovery only at the termination of the setback period. The system incorporates electronic keypad switches which provide fingertip control of the fan and the heating and cooling modes. A change between the heating and cooling modes can be provided automatically with conventional and heat pump systems. To this end, in the heat pump system a reversing valve control is provided. Capricious cycling between heating and cooling states is eliminated inasmuch as a temperature band is established around the normal temperature and the temperature must change in excess of the temperature band value in order to have a change in the heating or cooling state. A heat or cool only mode can also be established through the control keypad. An alternating time and temperature display is continuously provided on an 8-second cycle with the time and temperature, respectively, being displayed for 4-second intervals. The device relies on synchronization of the power line 60 Hz signal during normal operation and upon a quartz crystal during power outages for its time keeping functions.

In operation in its simplist mode, the device serves as a conventional thermostat and continuously controls a control zone at a preselected temperature. This mode of operation is, however, inefficient and wastes energy. Thus, the device employs a user-defined operation or control feature for establishing a comfort level adapted for various scheduled activities. For example, when residents leave a control zone unoccupied, it is unneccessary to maintain the normal temperature that is required when the residents are present in the dwelling. The device operation may be defined to provide both the normal comfort level and a more lenient and less energy consuming comfort level when the control zone is unoccupied.

The HVAC system operates with new efficiency inasmuch as a user by programming the device utilizes internal and permanent memory programs for controlling the HVAC systems. The device's operation includes three facets: mode control functions which provide the user with control of the HVAC system; programming functions entered by the user for initiating the device's logic for control of the temperature environment and program override functions which allow a user to temporarily suspend the device's programmed operation. While the governing logic of the device is sophisticated, cueing lights or prompting lights make the logic readily available to the user and guide the user through his programming of the device operation. Moreover, the cueing lights indicate that a particular attribute of the HVAC system is either activated or enabled for control by the device logic. During the user's programming of the device, the cueing lights indicate the type of response the device expects from the user. The response is shown on the device's numerical display upon being entered by the user.

MODE CONTROL FUNCTIONS

The mode control functions involve the use of a single key on the keypad and require no programming inputs to allow the user to enable or disable the different stages of the HVAC system. The mode control functions are: (1) FAN CONT/AUTO- allows the user to select continuous or automatic fan. In the automatic mode, the fan operates only when the HVAC system heating or cooling is operating. The cueing light indicates the fan is in an automatic mode. (2) HEAT and COOL keys permit selection of heat only, cool only or the automatic changeover mode. The cueing light indicates the particular function of the HVAC system which is enabled for control by processor logic. The light does not indicate that the function should be operating at the present time; logic determines whether or not the functions are activated from the programmed control temperature and the ambient temperature. Absence of a cueing light indicates the logic cannot activate the particular function. When both the heat and cool lights are illuminated, the automatic mode changeover logic will control the HVAC system. The automatic mode changeover is part of the logic that determines whether the heating or the cooling of the HVAC system should be controlling the building. (3) EM HEAT (heat pump only) is used to disable the heat pump in the event of its malfunction. The heat and cool keys are disabled and cannot be enabled until emergency heat is disabled. With emergency heat activated, only auxiliary (electric) heating is available for control of the comfort level.

PROGRAMING FUNCTIONS

The programming functions provide the operational information for the logic, allowing the user to tailor the device's operation to his particular needs. These functions may be grouped into two categories. The first type of functions inform the permanent memory logic of the environment that is being controlled. These functions include a temperature calibration to specify the current ambient temperature, a system calibration to specify the efficiency with which the HVAC system controls the building, and a clock function to specify the time and day of the week.

The second category of functions provide the ability to define comfort levels for the daily and weekly routines that are performed within the building. These functions request a control temperature, which is analogous to the setting of the temperature on a conventional thermostat, or request a time frame and temperature range for periods in which a more lenient comfort level is acceptable. The logic during these setback periods modifies the control temperature of the building. In winter a programmed minimum temperature becomes the control temperature, and the controlled zone is said to be in setback. During summer a programmed maximum temperature becomes the control temperature, and the controlled zone is set up. The modification of the control temperature reduces the differential between the indoor and outdoor temperatures, and thus reduces the energy consumption for the building. This second category of functions include: (1) A normal temperature to specify the control temperature for periods of "normal" activity such as work or recreation. (2) A night setback function that specifies a lenient comfort level for all the days of the week. It might involve a moderate setback in a home while the family is asleep or a substantial setback in commercial buildings that are unoccupied at night. (3) A day setback function that specifies a lenient comfort level for selected days of the week. It can provide substantial setback in homes where the entire family is absent (at work or school) during the week on a regular basis. Since the daytime setback program is active only on the days of the week selected by the user, manual override is unnecessary on the unscheduled days when the building is occupied (the weekend in a home for instance). In commercial operations daytime setback may be programmed for the weekends only, thus providing in conjunction with night setback complete setback during the entire weekend. (4) A trip setback function that operates on a one time basis to cover non-recurring periods of absence from the home or commercial building. Trip setback may be used for periods ranging from an hour to 99 days in duration. For example in the home, trip setback may be used for a shopping trip, a weekend trip, or an extended vacation. Alternately in commercial applications, trip setback may be used to save on energy consumption during holidays. (5) An adjust function provides temporary adjustment of the control temperature. It is useful in the home for parties or special occasions that require a comfort level other than that provided by the normal function.

The program functions of the device are requested by depressing one of the keys on the keypad. When the numeric display shows time and temperature, the initial depression of a key requests the function program marked on the key. Subsequent depressions request the digits marked on the key. A function program may be requested only when the numeric display is in its time/temperature display mode.

Before the program functions become an active part of logic, the user is required to enter parameters that describe his needs. These parameters might be a temperature or a time; in general they communicate the user's needs to logic. The device requests these parameters by illuminating cueing lights. The various program functions and the parameters they request are listed in Table 1. The actual mechanics of programming is set forth in Table 2. Use of these two tables should enable the user to configure the logic according to particular needs.

PROGRAM OVERRIDE FUNCTIONS

The program functions provide the necessary comfort levels for the routines that are performed within a controlled zone such as a building. These routines are inevitably broken, and the comfort level must be adjusted accordingly. The override functions provide this capability. They consist of a reset function, a restore to normal function, and a start setback function. The reset function is activated by depressing the RESET key for ten seconds. It erases all the previously programmed values, sets the normal temperature to 72° F., and enables the automatic changeover mode.

The restore to normal function requests the normal temperature as the control temperature for the building. If the normal temperature is already controlling the building, depressing the RESTORE TO NORM key has no effect. If the device is in a setback period, the normal temperature replaces the setback temperature range as the control temperature. However, the setback program is not cleared and may be reactivated by depressing the START SETBACK key. If the device is in an adjust period, depressing RESTORE TO NORM requests the normal temperature as the control temperature and the adjust program is erased.

The start setback function is the most complicated of the override functions because it has three separate setback programs that can be invoked. The night and day setback programs are treated similarly by the start setback function, and the trip setback function is treated somewhat differently.

In the case where no trip setback program has been entered, depressing the START SETBACK key has no effect when the device is already in a setback period. If the device is currently scheduled for a setback period, but is using the normal temperature for control because the RESTORE TO NORM key has been depressed, the start setback function will cause reentry into the currently scheduled setback period. If the device is in a scheduled normal period, depressing START SETBACK advances the program to the next scheduled setback period. If the device is in an adjust period, depressing START SETBACK advances the program the next or currently scheduled setback period and erases the adjust program.

As mentioned above, the trip setback program is treated differently by the override functions. When a trip setback program is requested, it will immediately become operational. The trip setback program can be overridden by the restore to normal function. If this action occurs, the device continues its programmed operation including entry into the night and day setback programs as scheduled. During this time, the value entered for the duration of the trip continues to count down. To invoke the trip setback function again, the user need only depress the START SETBACK key.

TABLE 1
DEVICE PROGRAM FUNCTIONS

| FUNCTION | PARAMETERS REQUESTED | USEAGE |
|---|---|---|
| Norm. Temp. | Temperature | Control temperature when Device is not in setback or adjust operation. |
| Clock | 1. Day Number | 1. Enter (1) through (7) for day of week. |
| | 2. Time | 2. Enter current military (24 hour) time. Depress ENTER key at the start of a new minute. |
| Temp. Cal. | Temperature | Enter current ambient temperature in degrees Farenheit as measured by an accurate thermometer. |
| Sys. Cal. | No cueing light | Enter a digit (0) through (9) to specify a time constant for the setback recovery logic. A (0) disables the logic. Enter a higher digit if the building does not reach the normal temperature by the end of a setback period. Enter a lower digit if the building reaches the normal temperature before the end of a setback period. |
| Nite Set | 1. Maximum Temp. | 1. Enter the maximum control temperature for the building for warm or hot outside temperatures. |
| | 2. Minimum Temp. | 2. Enter the minimum control temperature for the building for cool or cold outside temperatures. |
| | 3. Begin Time | 3. Enter the beginning time the night setback program is to take effect (military time). |
| | 4. End Time | 4. Enter the time the night setback program is to end. (military time). |
| Day Set | 1. Maximum Temp. | 1. Same as night setback program. |
| | 2. Minimum Temp. | 2. Same as night setback program. |
| | 3. Begin Time | 3. Same as night setback program. |
| | 4. End Time | 4. Same as night setback program. |
| | 5. Day Number | 5. Enter the days of the week the day setback program will function. |
| Trip Set | 1. Day Number | 1. Enter the number of complete 24 hour periods the absence is to include. Depress ENTER if the absence is less than 24 hours. |
| | 2. End Time | 2. Enter the expected time of return. The tripset program uses the temperature parameters from the day setback program. These parameters must be defined before the trip setback may become operational. |
| Adjust | Temperature | Enter a new temporary control temperature. The adjust period automatically ends at the beginning of the next setback period, or it may be cancelled with the use of the override functions. |

TABLE 2
MECHANICS OF PROGRAMMING DEVICE

1. Depress desired function key. The red cueing light of the first parameter of the function program is illuminated, and the display shows the currently programmed value if any.
2. To review the function program skip to Step 4. To define or change the function program parameter, depress the CLEAR key and the numeric display will show no value.
3. Enter the desired value for the parameter (as requested by the cueing light) on the numeric display. If an error is made, simply depress CLEAR and reenter.
4. With the desired value on the numeric display, depress ENTER to enter the parameter into the function program.
5. The display will now show one of two states. If no more parameters are being requested for the function program, the numeric display has returned to its time/temperature mode, and the cueing lights are extinguished. If there is another parameter in the function program, then its currently programmed value (if any) will show on the numeric display and the proper cueing light will be illuminated. In this case repeat Step 2 through Step 4 for each required parameter.
6. There are three exceptions to the steps listed above:
   a. The SYS CAL program does not illuminate any cueing lights. Otherwise the procedure is the same.
   b. The TEMP CAL program displays the current ambient temperature without calibration as measured by the device's circuits.
   c. The DAY SETBACK program treats entry of the days of the week differently. When the device displays the currently defined days of the week, they are flashed upon the numeric display with no user action. If they are satisfactory depressing ENTER will return the numeric display to its time/temperature mode. If the user wishes to enter or change the days of the week, he must depress CLEAR and then enter the days of the week in succession. After the last day has been entered, depressing ENTER will return the numeric display to its time/temperature mode.

During its operation as a sophisticated temperature controller, the device of the present invention must determine the control temperature to provide a comfort level within a building. The control temperature might be the normal temperature, an adjust temperature, or a minimum or maximum temperature from a setback program. The processor determines the control temperature from the time of day, the day of the week, and the user-defined programs.

Once the control temperature is established, a comfort level can be provided in the builiding. The comfort level is a one or two degree temperature "band" on either side of the control temperature. For example, assume the device is installed with a two degree control band to a single stage HVAC system and is in a heating mode. If the ambient temperature drops two degrees below the control temperature, the HVAC system heating will be activated. The heating will continue until the ambient temperature reaches two degrees above the control temperature. At this time, the system heating will be deactivated, and the above cycle will repeat itself. This cycle applies in reverse when the device is in a cooling mode.

The comfort level control band is selected at the time of installation along with the staging temperature increments for multistage HVAC systems and the changeover temperature increment for the automatic changeover logic. These are selected by the use of jumper wires (see Switches 151) on the back of devices printed circuit board.

With multistage systems, the first stage of heating or cooling is not always capable of maintaining the required comfort level, and it becomes necessary to activate the auxiliary stages. The staging temperature increments determine how many degrees above or below the control temperature the auxiliary stages are activated. For example, assume that the device is in a heating mode and is operating a multistage HVAC system. If the ambient temperature drops two degrees below the control temperature, the first stage will be activated. If the first stage heating is sufficient to warm the house, then the cycle discussed for single stage HVAC systems applies. If the first stage heating is not sufficient, then the ambient temperature will continue to drop. When it reaches four degrees below the control temperature, the second stage heating is activated. If the first and second stages of heating are sufficient to warm the builiding, then the ambient temperature will rise, and when it reaches two degrees above the control temperature, both the first and second stages of heating are deactivated. The same process occurs on HVAC systems with three stages available for heating, and the third stage is activated six degrees below the control temperature. The same process occurs for the HVAC system cooling except a reversing valve is provided for heat pump systems.

The changeover temperature increment for the automatic mode changeover logic is also selected with the jumper wires at the time of installation. The uses the automatic mode changeover logic to determine whether the heating or cooling mode should be provided for the building. The mode is initially set to heating when the device is first powered. Before the mode can be changed, the difference between the ambient and control temperatures must be equal to the changeover temperature increment. For example, again assume the device is presently in a heating mode, and has a control temperature of 72° F. If the ambient temperature rises to 79° F., a seven degree changeover temperature increment, then the device changes its mode to cooling and activates both stages of cooling. The cooling remains activated until the ambient temperature reaches 70° F., a two degree control band. The device remains in the cooling mode until the ambient temperature drops to 65° F., again a seven degree changeover temperature increment.

Referring now to the relationship between the automatic mode changeover logic and the mode indicator lights on the front panel, the logic resides in the processor and works independently of the mode indicator lights; it functions when two, one or even none of the indicator lights are illuminated. The mode indicators simply pass processor commands to the HVAC system; a HVAC system resource is activated only if it is requested by SmartStat and the mode indicator light is illuminated.

A further feature of the device is its behavior during power outages. The device comes equipped with two nine volt primary cells. They power the processor when electricity is not being supplied to a building, thus keeping intact the clock and the user-defined programs that have been entered. The batteries should provide service for a year under normal circumstances, a BATTERY indicator light is illuminated when the batteries will no longer power the computer for a reasonable length of time.

Of course, it is understood that although a preferred embodiment of the present invention has been illustrated and described various modifications thereof will become apparent to those skilled in the art, and accordingly, the scope of the present invention should be defined only by the appended claims and equivalents thereof.

We claim:

1. A programmable thermostatic control device for controlling a temperature within a preselected mode of an enclosed environment by selective operation of the heating, ventilation and air conditioning system sections, said device comprising:

a power supply for maintaining a regulated voltage, said power supply including a DC voltage regulator and a AC signal generator, said AC signal generator, serving to generate a signal which is superimposed upon the signal generated by said DC voltage regulator;

a temperature monitor for determining the existing temperature within the control zone ambient said device, said temperature monitor comprising circuitry for determining said ambient temperature through successive approximations and supplying said temperature information at its output in the form of an electronic signal;

heating, ventilation and air conditioning controls for selectively providing and output signal used in controlling the heating, ventilation and air conditioning systems response to the plurality of input signals, said heating, ventilation and air conditioning controls including AND gates which are provided at their respective inputs, with first signals indicating the enablement condition of preselected sections of the heating, ventilation and air conditioning system and further signals;

processing means for controlling said heating, ventilation and air conditioning controls and including memory means for storing operating instructions, said memory means including a permanent memory including a plurality of subroutines and a programmable memory which enters and loads information entered by the user together with information supplied by the temperature monitor, said processor means supplying said further signals to the input of said heating, ventilation and air conditioning controls indicating whether said processor means is directing the various sections of the heating, ventilation and air conditioning system to be turned on, said heating, ventilation and air conditioning controls providing signals at its output for energizing selected sections of the heating, ventilation and air conditioning system only upon signals being supplied at its input indicating that a preselected section of the heating, ventilation and air conditioning system is enabled and being commanded to operate by processor means;

means operably connected to said processing means for entering and loading instructions and temperature information for controlling the operation said processing means;

display means operably connected to said processing means for selectively providing a visual readout of selected information concerning the operation of said device;

further display means operably connected to said processing means for cueing the operator during the operation of entering and loading instructions for said processing means; and an interface unit serially connected between said heating, ventilation and air conditioning control and said heating, ventilation and air conditioning system, said interface unit selectively applying power to preselected sections said heating, ventilation and air conditioning system responsive to predetermined input signal being received from said heating, ventilation and air conditioning controls.

2. A programmable thermostatic control device for controlling the temperature within a preselected zone of an enclosed environment by selective operation of the heating, ventilation, and air conditioning system sections, said device comprising:

a power supply for maintaining a regulated voltage;

a temperature monitor for determining the existing temperature within the controlled zone ambient said device;

heating, ventilation and air conditioning controls for selectively providing an output signal used in controlling the heating, ventilation and air conditioning system in response to a plurality of input signals;

processing means for controlling said heating, ventilation and air conditioning controls, said processing means including memory means for storing operating instructions;

means operably connected to said processing means for entering and loading instructions and temperature information for controlling the operation of said processing means; and display means operably connected to said processing means for selectively providing a visual readout of selected information concerning the operation of said device, said display means further including means for cueing, the operator during the operation of entering and loading instructions of said processing means, said cueing means being driven by said processing means and assisting to simplify the operation of said thermostatic control device.

3. A thermostatic control device as defined in claim 2 including an interface unit serially connected between said heating, ventilation and air condiditioning controls and said heating, ventilation and air conditioning system, said interface unit including decoding means for controlling a plurality of heating, ventilation and air conditioning sections from one out-put signal whereby power is selectively applied to preselected sections of said heating, ventilation and air conditioning system responsive to predetermined input signals being received from said heating, ventilation and air conditioning controls.

4. A programmable thermostatic device as defined in claim 2 or 3 wherein said heating, ventilation and air conditioning system includes a heat pump having various section/stages and includes an auxiliary heating section which are independently controlled by said device through said interface unit.

5. A programmable thermostatic device as defined in claim 4 wherein the auxiliary heating section is inhibited during the recovery period unless the auxiliary heating section is used during the set-back period, thereby enabling utilization of the system with enhanced energy efficiency.

6. A programmable thermostatic device as defined in claim 5 wherein said recovery time is a function of the time the various sections of said heating, ventilation and/or air conditioning system are turned off and a function of the absolute value of the difference between the normal temperature and the ambient temperature.

7. A thermostatic control device as defined in claim 2 including means for manually overriding programming of said processing means such that said heating, ventilation and air conditioning system can be manually controlled by an operator.

8. A thermostatic control device for controlling the temperature in a preselected zone of an enclosed environment by selective operation of the heating, ventilation and air conditioning system which includes a heat pump having various section/stages, said heat pump further including an auxiliary heating section, each of said sections being independently controlled by said device which comprises:

a power supply for maintaining a regulated voltage;

a temperature monitor for determining the existing temperature within the control zone ambient said device, said temperature monitor comprising a single sensor;

heating, ventilation and air conditioning controls for selectively providing an input signal used for controlling the heating, ventilation and air conditioning system in response to a plurality of input signals;

an interface unit serially connected between said heating, ventilation and air conditioning controls and said heating, ventilation and air conditioning system, said interface unit including decoding means for controlling a plurality of heating, ventilation and air conditioning sections from one output signal whereby power is selectively applied to preselected sections of heating, ventilation and air conditioning system responsive to predetermined input signals being received from said heating, ventilation and air conditioning controls;

processing means for controlling said heating, ventilation and air conditioning controls, said processing means including memory means for storing operating instructions;

means operably connected to said processing means for entering and loading instructions and temperature information for controlling the operation of said processing means;

display means operably connected to said processing means for selectively providing a visual readout of selective information concerning the operation of said device, said display means further including means for cueing the operator during the operation of entering and loading instructions of said processing means, said cueing means being driven by said processing means and assisting to simplify the operation of said thermostatic control device;

means for manually overriding said processing means such that said heating, ventilation and air conditioning system cab be manually controlled by an operator; and means for inhibiting the auxiliary heating section during the recovery period unless the auxiliary heating section is used during the set-back period.

* * * * *